US011047266B2

(12) United States Patent
Bairley et al.

(10) Patent No.: US 11,047,266 B2
(45) Date of Patent: Jun. 29, 2021

(54) HEAT EXCHANGER WITH HEAT EXCHANGE TUBES MOVEABLE BETWEEN ALIGNED AND NON-ALIGNED POSITIONS

(71) Applicant: General Electric Company, Schenectady, NY (US)

(72) Inventors: Donald William Bairley, Southington, CT (US); Jeffrey Frederick Magee, Longmeadow, CT (US); James Pschirer, Enfield, CT (US)

(73) Assignee: General Electric Company, Schenectady, NY (US)

( * ) Notice: Subject to any disclaimer, the term of this patent is extended or adjusted under 35 U.S.C. 154(b) by 62 days.

(21) Appl. No.: 16/668,336

(22) Filed: Oct. 30, 2019

(65) Prior Publication Data
US 2021/0131314 A1    May 6, 2021

(51) Int. Cl.
  *F01K 23/10*   (2006.01)
  *F28D 7/00*    (2006.01)
  *F28F 5/00*    (2006.01)

(52) U.S. Cl.
  CPC .......... *F01K 23/101* (2013.01); *F28D 7/0066* (2013.01); *F28F 5/00* (2013.01)

(58) Field of Classification Search
  CPC ...... F01K 23/101; F28D 7/0066; F28D 11/00; F28D 15/0208
  See application file for complete search history.

(56) References Cited

U.S. PATENT DOCUMENTS

| 3,788,392 A | * | 1/1974 | Abbott | F28D 11/04 |
| | | | | 165/92 |
| 4,076,072 A | * | 2/1978 | Bentz | F01P 3/18 |
| | | | | 165/41 |
| 4,664,178 A | * | 5/1987 | Echols | F28F 9/22 |
| | | | | 122/382 |
| 6,032,728 A | | 3/2000 | Ross et al. | |

(Continued)

FOREIGN PATENT DOCUMENTS

DE    112014000867 T5    12/2015
EP       0002823 A1       7/1979
(Continued)

OTHER PUBLICATIONS

EP Search Report, Application No. EP20202158, dated Jan. 28, 2021, pp. 1-2.

*Primary Examiner* — Jesse S Bogue
(74) *Attorney, Agent, or Firm* — Hoffman Warnick LLC

(57) ABSTRACT

A heat exchanger includes a plurality of heat exchange tubes arranged into a first row of tubes and a second row of tubes. A fixed mount fixedly positions the first row of tubes, and a movable mount makes the second row of tubes movable between an aligned position in which tubes in the second row are aligned with tubes in the first row, creating a linear flow path for the fluid through the tubes, and a non-aligned position in which tubes in the second row are not aligned with tubes in the first row, creating a curvilinear flow path for the fluid through the plurality of tubes. Heat is exchanged between the first fluid and a second fluid passing through the plurality of heat exchange tubes. The heat exchanger may be employed as an HRSG in a combined cycle plant, among other applications.

20 Claims, 9 Drawing Sheets

(56) References Cited

U.S. PATENT DOCUMENTS

| | | | | |
|---|---|---|---|---|
| 7,434,765 | B2 * | 10/2008 | Zielinski | B64D 13/00 |
| | | | | 244/57 |
| 8,002,902 | B2 | 8/2011 | Krowech | |
| 8,534,346 | B1 | 9/2013 | Mecozzi | |
| 8,671,688 | B2 | 3/2014 | Rogers et al. | |
| 9,234,480 | B2 * | 1/2016 | Gayton | F02G 1/055 |
| 9,995,170 | B2 | 6/2018 | Magee et al. | |
| 10,532,436 | B2 * | 1/2020 | Giuliano | B66F 7/0608 |
| 10,533,810 | B2 * | 1/2020 | Lynn | F04B 39/12 |
| 2009/0205310 | A1 | 8/2009 | Hibshman, II et al. | |
| 2009/0260361 | A1 * | 10/2009 | Prueitt | F01K 27/00 |
| | | | | 60/670 |
| 2012/0198846 | A1 | 8/2012 | Sieben et al. | |
| 2016/0116158 | A1 | 4/2016 | Krowech et al. | |
| 2018/0058327 | A1 * | 3/2018 | Tajiri | F02K 3/105 |
| 2018/0216496 | A1 | 8/2018 | Smith et al. | |

FOREIGN PATENT DOCUMENTS

| | | |
|---|---|---|
| EP | 2505915 A1 | 10/2012 |
| WO | 2016057911 A1 | 4/2016 |

* cited by examiner

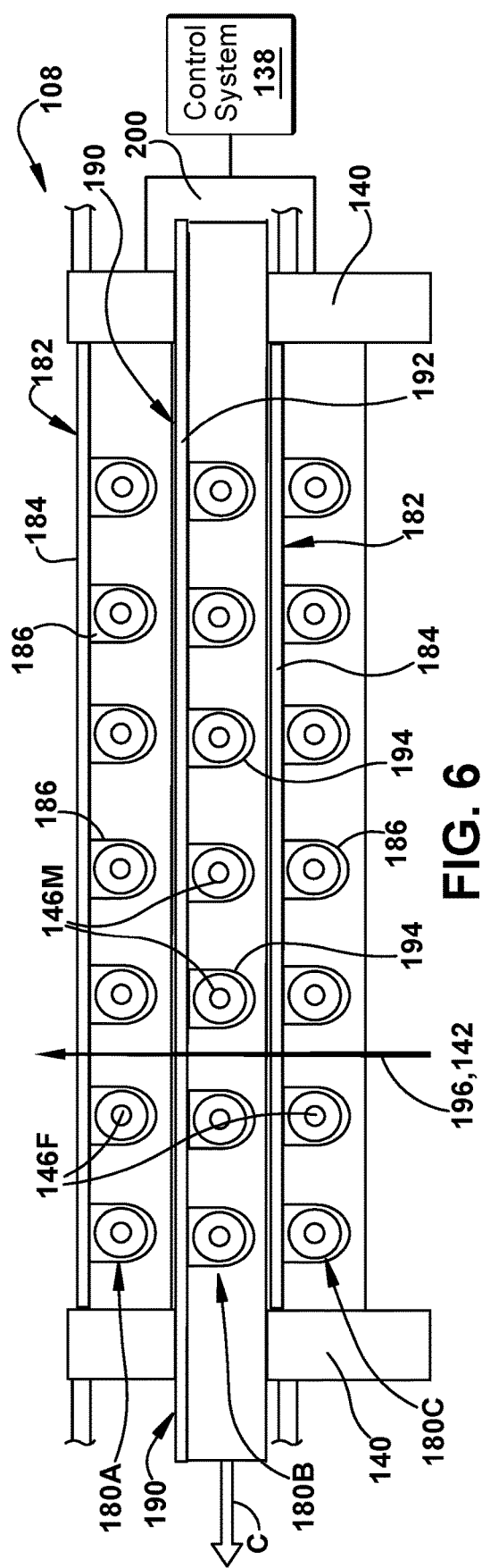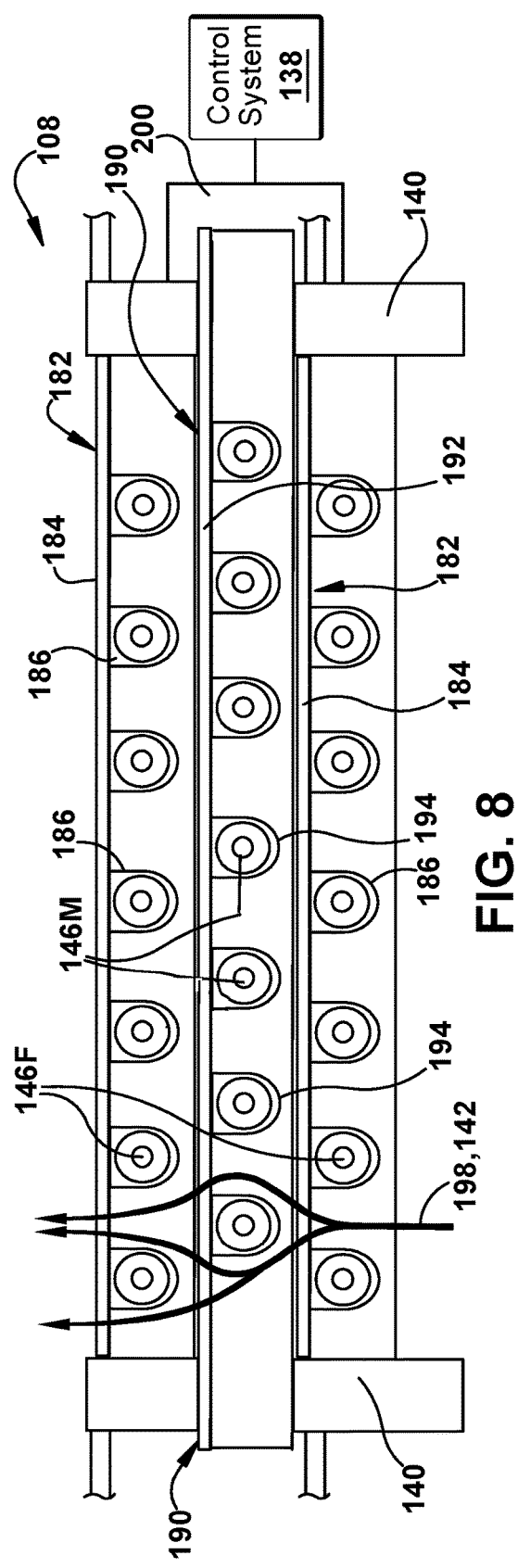

HEAT EXCHANGER WITH HEAT EXCHANGE TUBES MOVEABLE BETWEEN ALIGNED AND NON-ALIGNED POSITIONS

BACKGROUND

The disclosure relates generally to heat exchangers and, more particularly, to a heat exchanger including heat exchange tubes with tubes in row(s) capable of moving into or out of alignment with heat exchange tubes in another row, creating a linear or curvilinear flow path for a fluid passing through the heat exchanger.

Convective heat exchangers include multiple rows of heat exchange tubes fixed in either in a staggered or non-aligned arrangement, or in an in-line or aligned arrangement. Managing operations of the heat exchangers with fixed heat exchange tube arrangements poses a number of challenges. While applicable to any heat exchanger, to illustrate the challenges and benefits of embodiments of the disclosure, the disclosure will consider a heat exchanger in the form of a heat recovery steam generator (HRSG) in a combined cycle power plant (CCPP) including a gas turbine (GT) system and a steam turbine (ST) system. In this setting, efficacy of the HRSG varies due to a number of operating parameters. In the CCPP example, heat input may vary due to operating parameters such as but not limited to: GT system load, ambient temperature, GT system degradation, GT system modification/uprating, duct burner load, and deviations between expected and actual operation. Similarly, heat exchange efficiency within the HRSG may vary due to operating parameters of the HRSG such as its cleanliness.

A heat exchanger with a fixed arrangement of its heat exchange tubes cannot be adjusted to address the above variations. Second, in CCPPs, during ST system startup, reduced steam temperatures are typically required to reduce thermal fatigue that may impact equipment lifetime expectancy. The fixed heat exchange tube arrangements require controlling the steam temperatures through complex controls, e.g., controlling GT system exhaust temperature or flow rate input, steam/water flow, etc. Third, cleaning the heat exchange tubes in an HRSG can be challenging. For example, a staggered heat exchange tube arrangement is desired in many cases because it is more compact, but the resulting lack of access to the internally positioned heat exchange tubes makes cleaning of such an arrangement very difficult. Finally, fixed heat exchange tube arrangements can result in unwanted noise due to vortex shedding frequency resonance.

BRIEF DESCRIPTION

A first aspect of the disclosure provides a heat exchanger, comprising: a casing configured to direct a first fluid therethrough; a plurality of heat exchange tubes fluidly coupled to a header and positioned within the casing, the plurality of heat exchange tubes arranged into a first row of tubes and a second row of tubes; a fixed mount fixedly positioning the first row of tubes relative to the casing; and a movable mount operatively coupled to the second row of tubes, the movable mount movable between an aligned position in which heat exchange tubes in the second row of tubes are aligned with heat exchange tubes in the first row of tubes, creating a linear flow path for the first fluid through the plurality of heat exchange tubes, and a non-aligned position in which heat exchange tubes in the second row of tubes are not aligned with heat exchange tubes in the first row of tubes, creating a curvilinear flow path for the first fluid through the plurality of heat exchange tubes, wherein heat is exchanged between the first fluid and a second fluid passing through the plurality of heat exchange tubes.

A second aspect of the disclosure provides a combined cycle power plant, comprising: a gas turbine system; a steam turbine system; and a heat recovery steam generator (HRSG) coupled to the gas turbine system to create steam for the steam turbine system using an exhaust of the gas turbine system, wherein the HRSG includes: a casing configured to direct the exhaust therethrough; a plurality of heat exchange tubes fluidly coupled to a water/steam header and positioned within the casing, the plurality of heat exchange tubes arranged into a first row of tubes and a second row of tubes; a fixed mount fixedly positioning the first row of tubes relative to the casing; and a movable mount operatively coupled to the second row of tubes, the movable mount movable between an aligned position in which heat exchange tubes in the second row of tubes are aligned with heat exchange tubes in the first row of tubes, creating a linear flow path for the exhaust through the plurality of heat exchange tubes, and a non-aligned position in which heat exchange tubes in the second row of tubes are not aligned with heat exchange tubes in the first row of tubes, creating a curvilinear flow path for the exhaust through the plurality of heat exchange tubes, wherein heat is exchanged between the exhaust and a water/steam flow passing through the plurality of heat exchange tubes.

A third aspect of the disclosure provides a method for operating a heat recovery steam generator (HRSG) of a combined cycle power plant (CCPP), the HRSG including a plurality of heat exchange tubes arranged in rows, the HRSG being part of a system including a gas turbine (GT) system and a steam turbine (ST) system, the method comprising: measuring at least one operating parameter of at least one of the HRSG, a gas turbine (GT) system of the CCPP and a steam turbine (ST) system of the CCPP; and in response to at least one operating parameter not meeting a threshold, moving a first row of the plurality of heat exchange tubes relative to a second, fixed row of the plurality of heat exchange tubes between an aligned position in which heat exchange tubes in the second row of the plurality of heat exchange tubes are aligned with heat exchange tubes in the first row of the plurality of heat exchange tubes, creating a linear flow path for a first fluid through the plurality of heat exchange tubes, and a non-aligned position in which heat exchange tubes in the second row of the plurality of heat exchange tubes are not aligned with heat exchange tubes in the first row of the plurality of heat exchange tubes, creating a curvilinear flow path for the first fluid through the plurality of heat exchange tubes, wherein heat is exchanged between the first fluid and a second fluid passing through the plurality of heat exchange tubes.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 6 shows a cross-sectional plan view along view line A-A in FIG. 5 of the heat exchanger with vertical heat exchange tubes in the aligned position, according to embodiments of the disclosure;

FIG. 8 shows a cross-sectional plan view along view line B-B in FIG. 7 of the heat exchanger with vertical heat exchange tubes in the non-aligned position, according to embodiments of the disclosure;

Figure 1:
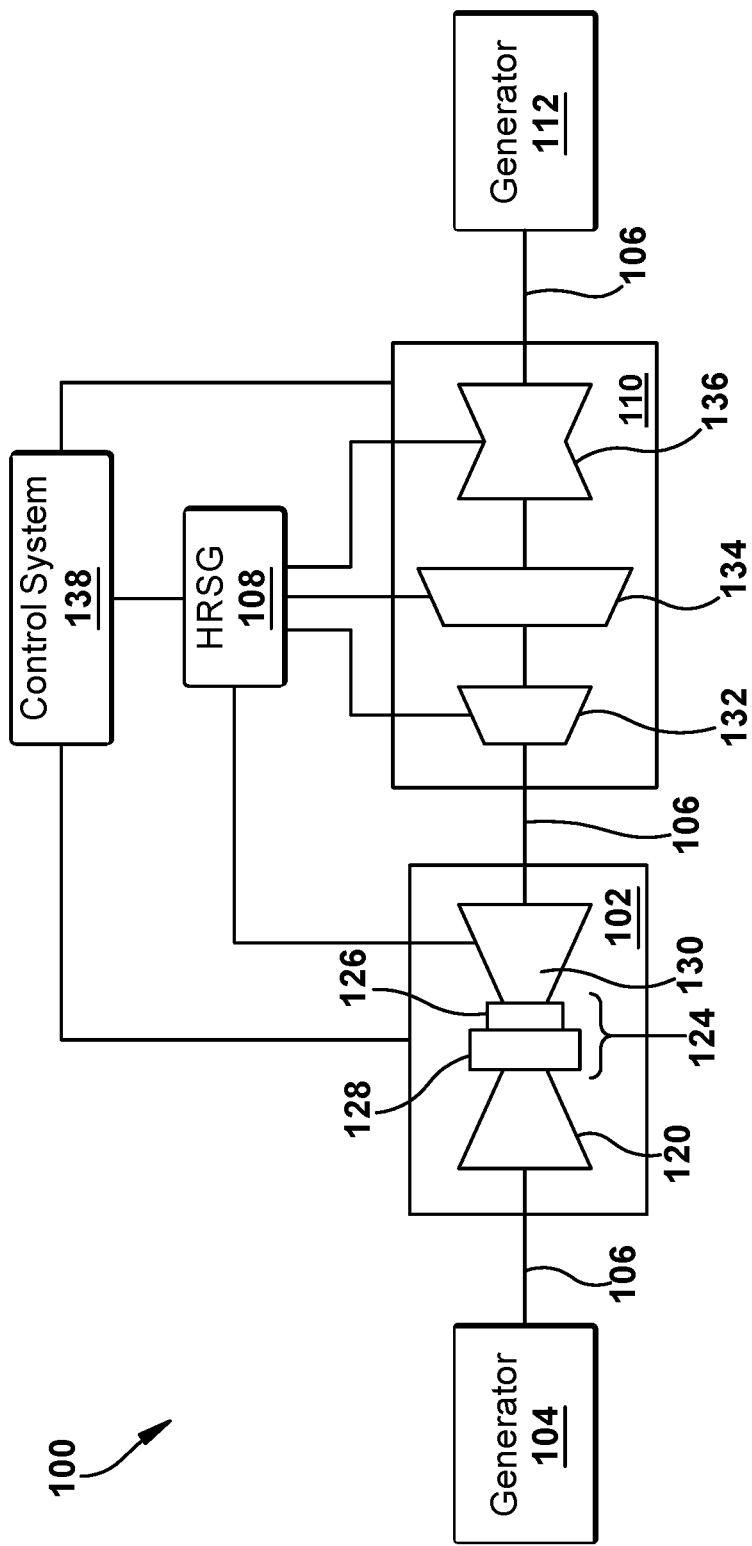
FIG. 1 shows a schematic view of an illustrative application in the form of a combined cycle power plant for a heat exchanger, according to embodiments of the disclosure.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the current technology, it will become necessary to select certain terminology when referring to and describing components within an illustrative application in the form of a combined cycle power plant and parts thereof. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to as elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as a working fluid through the turbine engine or, for example, the flow of hot gas through a heat exchanger. The term "downstream" corresponds to the direction of flow of the fluid, and the term "upstream" refers to the direction opposite to the flow. The terms "forward" and "aft," without any further specificity, refer to directions, with "forward" referring to the front or compressor end of the engine, and "aft" referring to the rearward or turbine end of the engine.

It is often required to describe parts that are located at differing radial positions with regard to a center axis. The term "radial" refers to movement or position perpendicular to an axis. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbine.

In addition, several descriptive terms may be used regularly herein, as described below. The terms "first", "second", and "third" may be used interchangeably to distinguish one component from another and are not intended to signify location or importance of the individual components.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Where an element or layer is referred to as being "on," "engaged to," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

As indicated above, the disclosure provides a heat exchanger with adjustability of heat exchange tube position. The heat exchanger may include a plurality of heat exchange tubes arranged into rows of tubes. A fixed mount fixedly positions a fixed row of tubes, and a movable mount makes another row of tubes movable between an aligned position and a non-aligned position of the tubes. In the aligned position, the tubes in the movable row are aligned or in-line with tubes in the fixed row of tubes, creating a linear flow path for the fluid through the tubes. In the non-aligned position, the tubes in the movable row are not aligned or are staggered with tubes in the fixed row, creating a curvilinear flow path for the fluid through the plurality of tubes. Heat may be exchanged between the first fluid and a second fluid passing through the plurality of heat exchange tubes, regardless of position.

Turning to FIG. 1, a heat exchanger according to embodiments of the disclosure will be described relative to an illustrative application in the form of a combined cycle power plant (CCPP) 100. FIG. 1 shows a schematic view of CCPP 100. It is emphasized that the teachings of the disclosure are applicable to any heat exchanger. CCPP 100 may include a gas turbine (GT) system 102 operably connected to a generator 104, and a steam turbine (ST) system 110 operably coupled to another generator 112. Generator 104 and GT system 102 may be mechanically coupled by a shaft 106, which may transfer energy between a drive shaft (not shown) of GT system 102 and generator 104. In the illustrative application, CCPP 100 is a single shaft system with two generators, but one with skill in the art will readily understand that the teachings of the disclosure are applicable to any variety of combined cycle power generating system.

Also shown in FIG. 1, a heat exchanger 108 is operably connected to GT system 102 and ST system 110. As will be described in greater detail herein, heat exchanger 108 may include a heat recovery steam generator (HRSG) including adjustable heat exchange tube positioning in accordance with embodiments of the disclosure. Heat exchanger 108 may be fluidly connected to both GT system 102 and ST system 110 via conventional conduits (numbering omitted).

It is understood that generators 104, 112 and shaft 106 may be of any size or type known in the art and may differ depending upon their application or the system to which they are connected. Common numbering of the generators and shafts is for clarity and does not necessarily suggest these generators or shafts are identical.

GT system 102 may include a compressor 120 and a combustor 124. Combustor 124 includes a combustion region 126 and a fuel nozzle assembly 128. GT system 102 also includes a gas turbine 130 coupled to common compressor/turbine shaft 106. In one embodiment, GT system 102 may be a MS7001FB engine, sometimes referred to as a 9FB engine, commercially available from General Electric Company, Greenville, S.C. The present disclosure is not limited to any one particular GT system and may be implanted in connection with other engines including, for example, the MS7001FA (7FA) and MS9001FA (9FA) engine models of General Electric Company.

In operation, air enters the inlet of compressor 120, is compressed and then discharged to combustor 124 where fuel, such as a gas, e.g., natural gas, or a fluid, e.g., oil, is burned to provide high energy combustion gases which drive gas turbine 130. In gas turbine 130, the energy of the hot gases is converted into work, some of which is used to drive compressor 120 through rotating shaft 106, with the remainder available for useful work to drive a load such as generator 104 via shaft 106 for producing electricity.

FIG. 1 also represents CCPP 100 in its simplest form in which the energy in the exhaust gases exiting gas turbine 130 are converted into additional useful work. The exhaust gases enter heat exchanger 108, in the form of an HRSG, in which water is converted to steam in the manner of a boiler. Heat exchanger 108 may also use the energy to create hot feedwater, e.g., having temperature in the range of 95° C. to 99° C.

ST system 110 may include one or more steam turbines. For example, ST system 110 may include a high pressure (HP) turbine 132, an intermediate pressure (IP) turbine 134 and a low pressure (LP) turbine 136, each of which are coupled to shaft 106. Each steam turbine 132, 134, 136 includes a plurality of rotating blades (not shown) mechanically coupled to shaft 106. In operation, steam from heat exchanger 108, and perhaps other sources, enters an inlet of HP turbine 132, IP turbine 134 and/or LP turbine 136 and is channeled to impart a force on blades thereof, causing shaft 106 to rotate. As understood, steam from an upstream turbine may be employed later in a downstream turbine. The steam thus produced by heat exchanger 108 drives at least a part of ST system 110 in which additional work is extracted to drive shaft 106 and an additional load such as second generator 112, which, in turn, produces additional electric power. In some configurations, turbines 130, 132, 134, 136 drive a common generator.

FIG. 1 also shows a CCPP control system 138 operatively coupled to GT system 102, heat exchanger (i.e., HRSG) 108, and ST system 110. Control system 138 may include any now known or later developed computerized controller for providing automated control of CCPP 100. As will be described, control system 138 may carry out a method according to embodiments of the disclosure.

Figure 2:
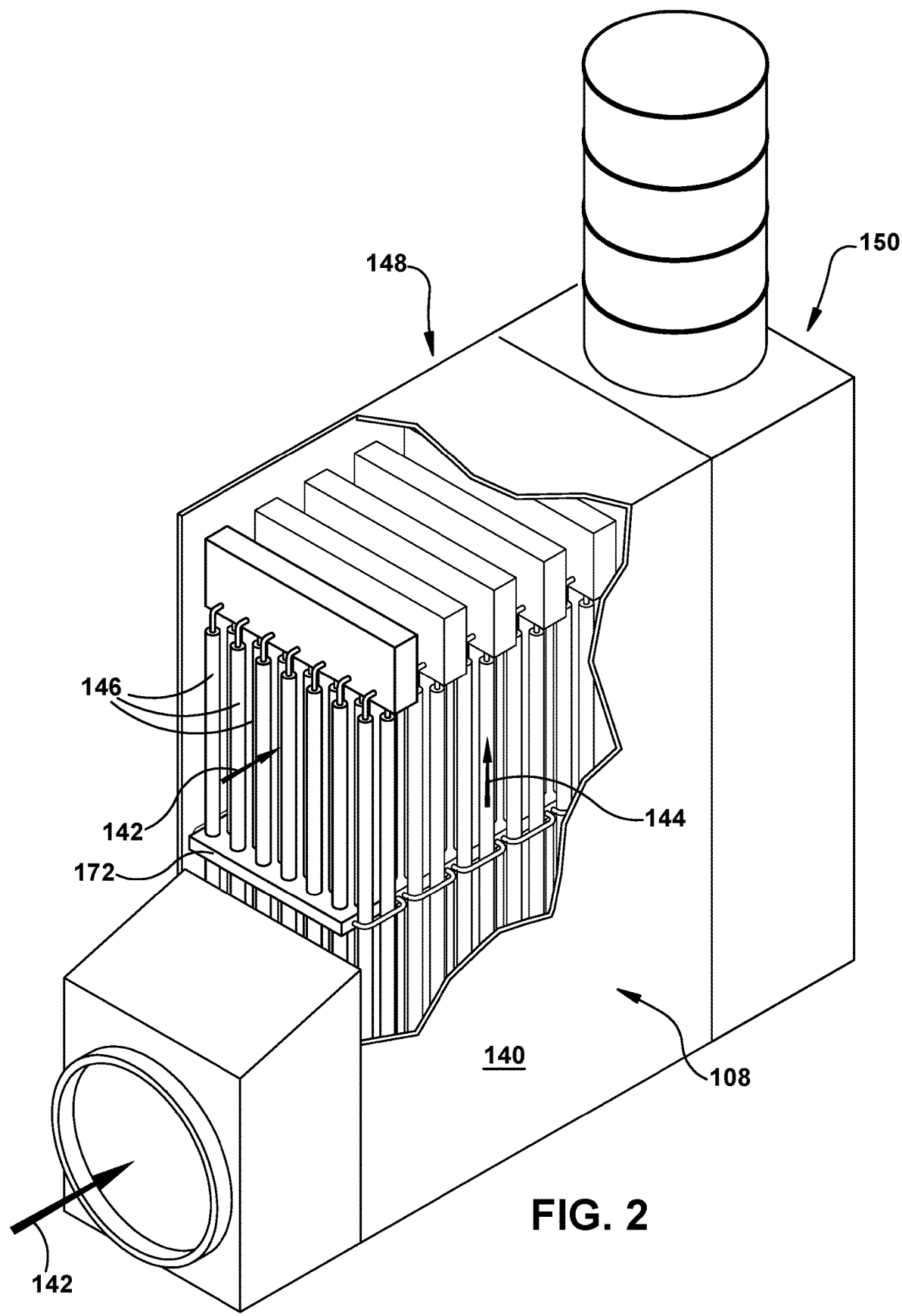
FIG. 2 shows a partially transparent perspective view of a heat exchanger with vertical heat exchange tubes, according to one embodiment of the disclosure.
Figure 3:
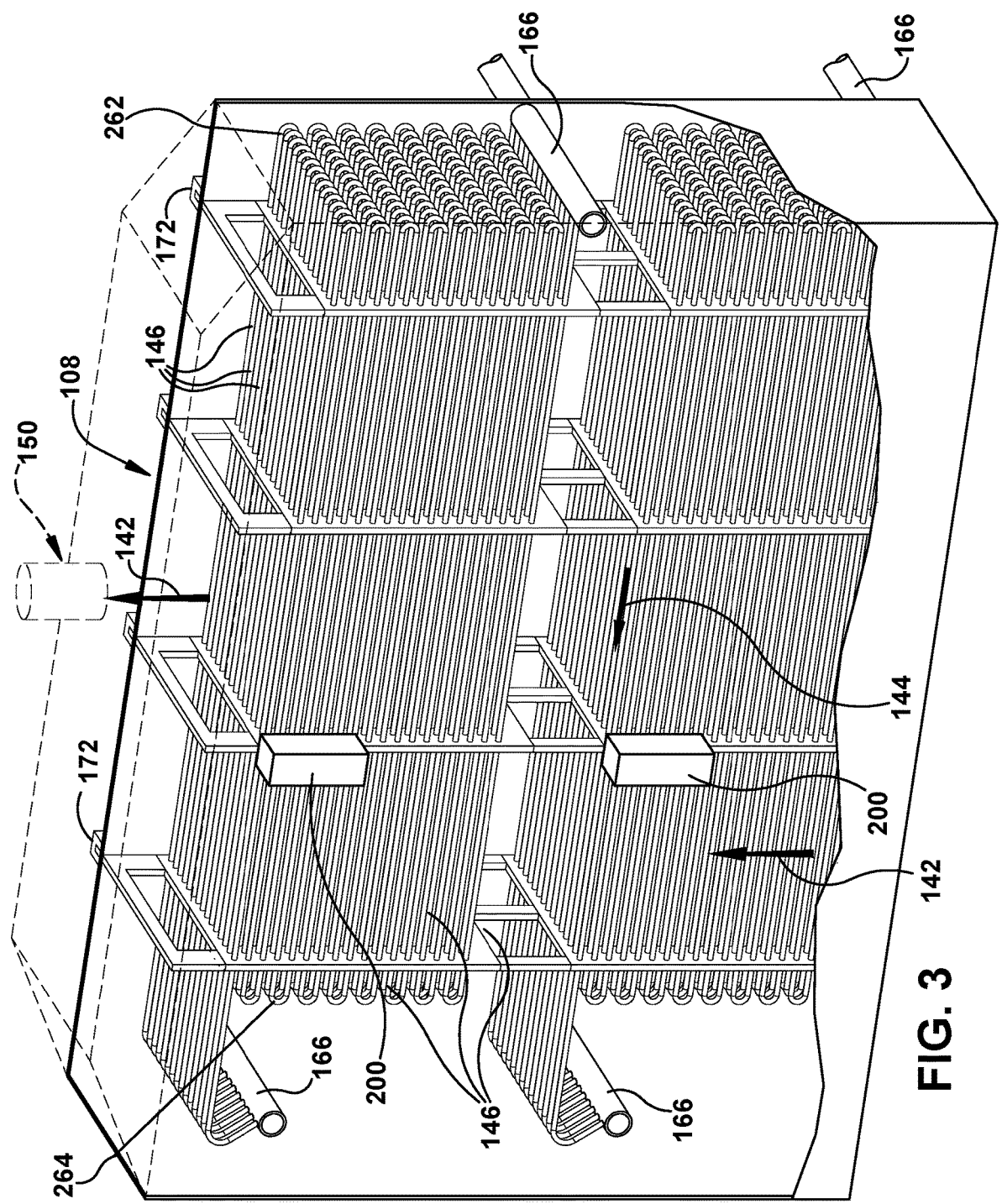
FIG. 3 shows a partially transparent perspective view of a heat exchanger with horizontal heat exchange tubes, according to another embodiment of the disclosure.

FIGS. 2 and 3 show partially transparent, perspective views of embodiments of heat exchanger 108. Heat exchanger 108 is illustrated as an HRSG configured to couple to GT system 102 (FIG. 1) and to deliver steam to, e.g., ST system 110 (FIG. 1) and/or heated water to other parts of CCPP 100 (FIG. 1). As illustrated, heat exchanger 108 includes an insulated casing 140 (hereinafter "casing 140") configured to contain a fluid 142. Casing 140 may be housed in an HRSG enclosure 148. Casing 140 may include any now known or later developed insulated duct configured to contain fluid 142, e.g., with a carbon steel or stainless steel inner liner, insulation layer and outer carbon steel layer.

Fluid 142 may be any form of gas having a heat differential with a fluid 144 (shown by arrows only) passing through a plurality of heat exchange tubes 146 of heat exchanger 108. Heat is exchanged between fluid 142 and fluid 144. Fluid 142 may be combustion gas exhaust from GT system 102 (FIG. 1), and fluid 144 may be a liquid, e.g., water, and/or gas, e.g., steam. Fluid 142 passes over and around the exterior surfaces of a plurality of heat exchange tubes 146 and exits casing 140 via an exhaust system 150, e.g., a stack and/or scrubber, etc., while fluid 144 passes through the interior of the plurality of heat exchange tubes 146. Enclosure 148 may include any now known or later developed structural protection, e.g., a building or other physical protection.

FIGS. 2 and 3 differ in that, in FIG. 2, tubes 146 extend in a vertical direction or arrangement and fluid 142 passes thereabout in a generally horizontal direction, while, in FIG. 3, tubes 146 extend in a horizontal direction or arrangement and fluid 142 passes thereabout in a generally vertical direction. As used herein, "generally" as applied to a flow direction of fluid 142 indicates that the fluid usually travels in the stated direction with some minor or temporary deviations as it passes over or about tubes 146 that may impede its path.

Tubes 146 may have any now known or later developed form of heat exchange tubes and may be made of any material capable of providing the desired heat transfer characteristics, flexibility, and ability to withstand the environment in which exposed. Tubes 146 may vary in size depending on application, e.g., in some applications varying from 1.25 inches to 2.0 inches in outer diameter. In one embodiment, tubes 146 may take on any form as described in co-pending U.S. patent application Ser. No. 16/230,736, filed Dec. 14, 2018, which is hereby incorporated by reference.

Figure 4:
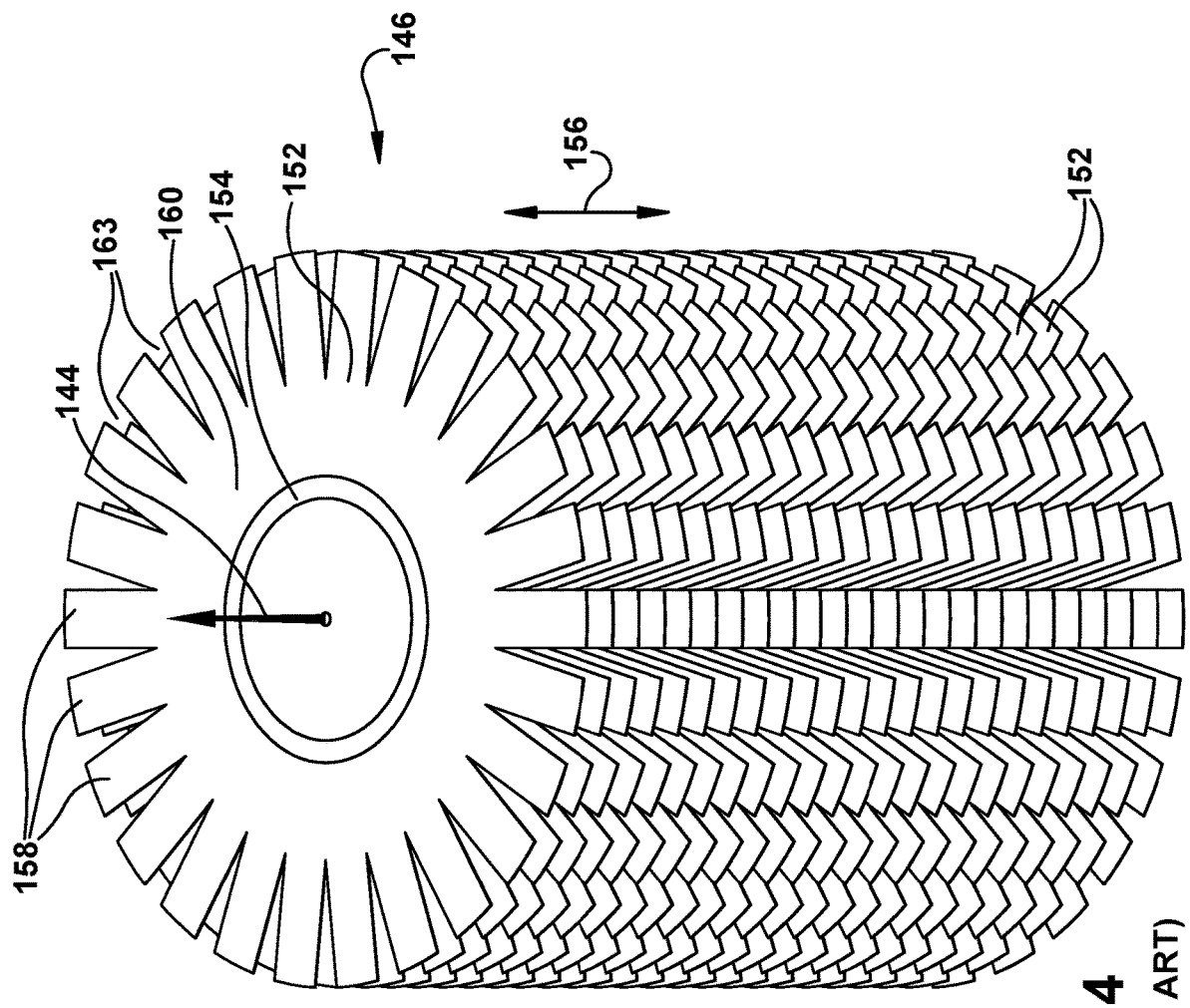
FIG. 4 shows a perspective view of an example heat exchange tube.

FIG. 4 shows a perspective view of one embodiment of a finned tube from the noted application. As illustrated, tubes 146 may include a plurality of disks 152 disposed around a center tube 154 aligned in a longitudinal direction 156. Each disk 152 may be substantially planar and may be stacked such that it is disposed longitudinally above and/or below at least one adjacent disk 152. Center tube 154 may include any now known or later developed tubular member configured to allow fluid 144 to pass therethrough, e.g., by pumping or other force. Each disk 152 may include a plurality of fin segments 158 extending radially outward from a disk center portion 160, such that fin segments 158 extend outwardly from center tube 154. Disk center portion 160 extends circumferentially around the outer circumference of center tube 154. Each of fin segments 158 is separated from an adjacent fin segment 158 by a serration 163. Fin segments 158 of adjacent disks can be circumferentially and/or longitudinally aligned or circumferentially and/or longitudinally offset. Fin segments 158 may be arranged in a spiral configuration, an alternating pattern, and/or a random configuration relative to fin segments 158 longitudinally above and/or below them.

Disk(s) 152 may be at least partially composed of aluminum and/or other thermally conductive materials such as beryllium, copper, gold, magnesium, iridium, molybdenum, rhodium, silver, tungsten, and/or other suitable materials, as well as alloys thereof. Center tube 154 may be at least partially composed of carbon steel, alloy steel, stainless steel, ferritic stainless, austenitic stainless, and/or other materials that are sufficiently thermally conductive, stress tolerant, and temperature resistant.

In some embodiments, an HRSG may include center tubes 154 in the superheater and/or evaporate sections (not labeled) that are composed of materials that are resistant to higher temperatures (for example, 1100° F.). The HRSG may also include center tubes 154 in the economizer and/or evaporate sections (not labeled) that are composed of materials that have lower temperature resistance and higher thermal conductivity. While one example of a tube 146 has been described, it is understood that heat exchanger tubes can take a variety of alternative forms.

Figure 5:
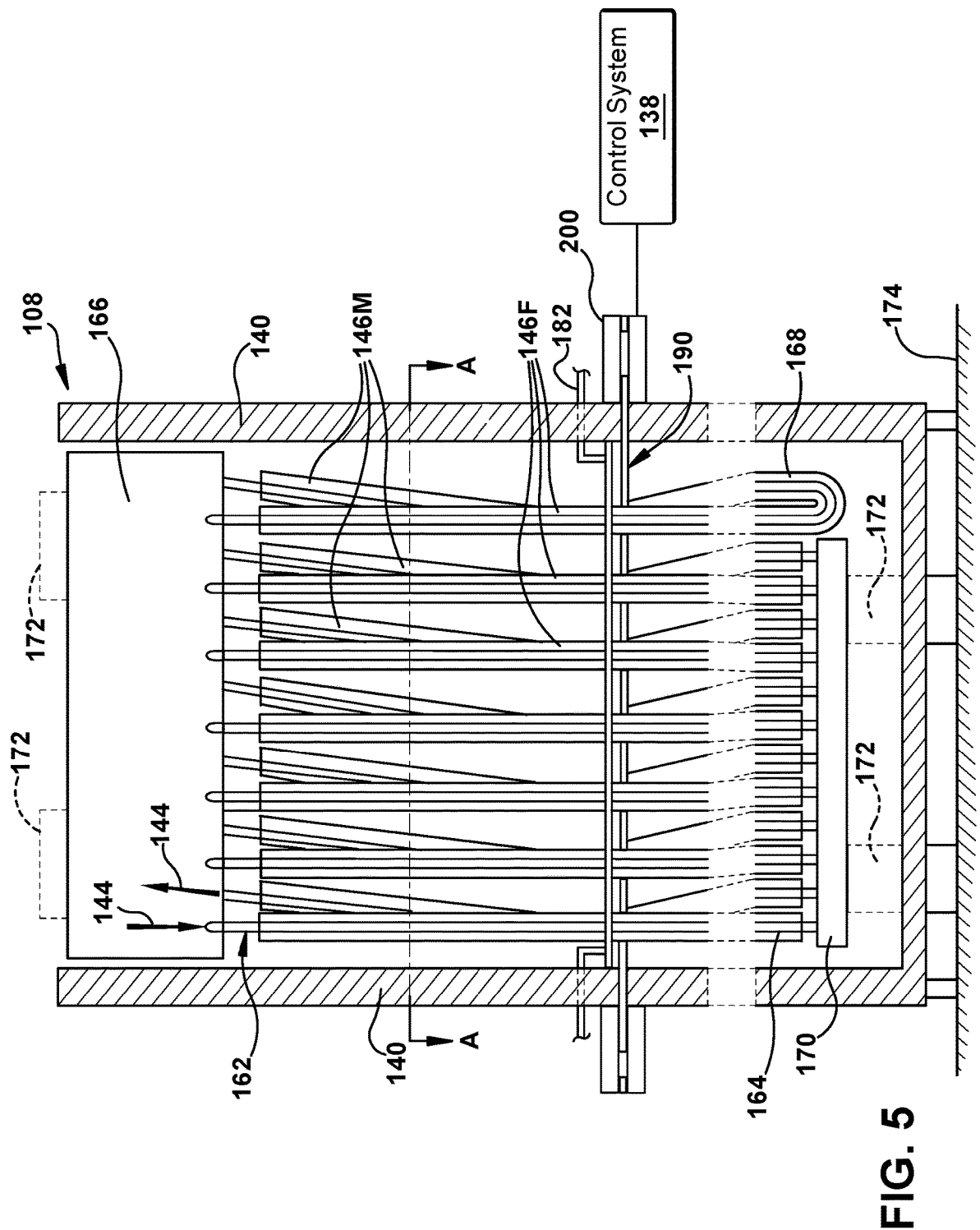
FIG. 5 shows a schematic front view of a heat exchanger with vertical heat exchange tubes in an aligned position, according to embodiments of the disclosure.
Figure 7:
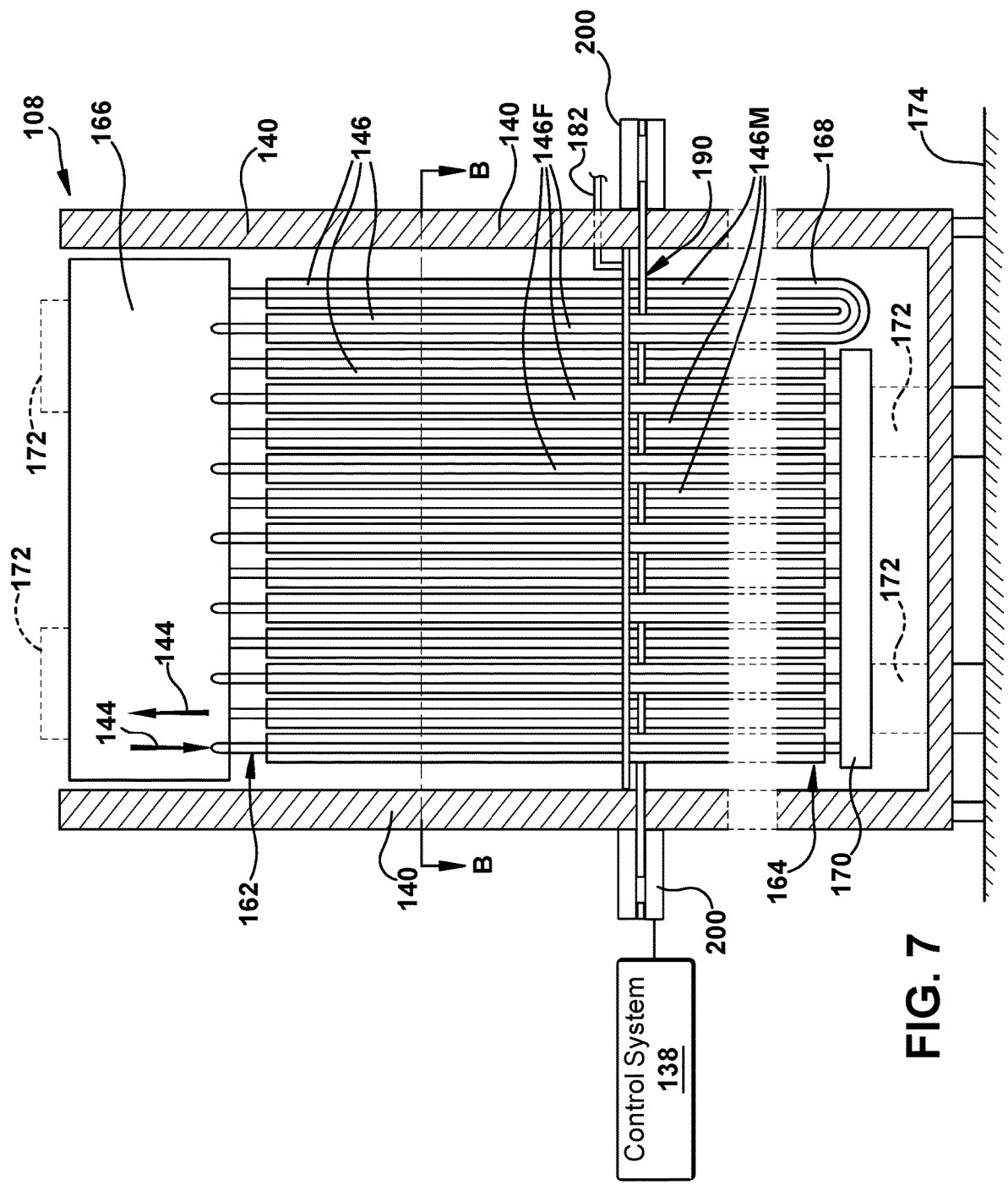
FIG. 7 shows a schematic front view of a heat exchanger with vertical heat exchange tubes in a non-aligned position, according to embodiments of the disclosure.

FIGS. 5 and 7 show schematic front views of a plurality of heat exchange tubes 146 (hereinafter 'tube' or 'tubes' 146), and FIGS. 6 and 8 show schematic plan view of tubes 146. FIGS. 5-8 have tubes 146 arranged vertically, as in the FIG. 2 embodiment. FIGS. 5 and 6 show tubes 146 in an in-line or aligned arrangement, and FIGS. 7 and 8 shows tubes 146 in a non-aligned or staggered arrangement. As used herein, as applied to tubes 146, the terms "aligned" or "aligned position" indicate that adjacent rows of tubes 180 are in line relative to a flow direction of fluid 142 through heat exchanger 108. That is, a center of tubes 146 in all rows are on the same line, or nearly on the same line, such that fluid 142 may flow by tubes subsequent to a first encountered row thereof with little to no flow impacting portions of the tubes in subsequent rows. The aligned arrangement creates a linear flow path 196 (FIG. 6).

In contrast, the terms "non-aligned" or "non-aligned position" indicate that adjacent rows of tubes 180 are not in line relative to a flow direction of fluid 142. That is, a center of tubes 146 of different rows are not close to being on the same line such that fluid 142 impacts tubes in a first encountered row thereof and at least some portion of tubes of most, if not all, subsequent rows. The non-aligned arrangement creates a curvilinear flow path 198 (FIG. 8). The extent to which fluid 142 impacts tubes of each row in the non-aligned position depends on the extent of the non-alignment or staggering, i.e., there are numerous non-aligned positions.

Each tube 146 is positioned within casing 140 and fixedly positioned at opposing ends 162 and 164 thereof. Tube ends 162, 164 may vary in structure. In one embodiment, each tube 146 may be fluidly coupled to a header 166, 170 at end(s) 162, 164 thereof. Although not shown, it is understood that various headers 166, 170 that feed a number of tubes 146 may be each coupled to a larger manifold. In the examples of FIGS. 5 and 7, an upper end 162 is coupled to header 166. Another end 164 of each tube 146 may include a U-turn 168 to redirect fluid 144 in the opposing direction or may be fluidly coupled to another header 170. Header(s) 166, 170 may fluidly couple various tubes 146 and may allow for movement of fluid 144 into or out of heat exchanger 108. Tubes 146, as will be further described, may be supported by any now known or later developed fashion by support(s) 172. In FIGS. 5 and 7, examples of supports 172 (some shown in phantom) may include lugs attached to header 166, lugs attached to a manifold (not shown) above header 166, and/or supports on floor 174 that extend through casing 140. Tubes 146 and headers 166, 170 may be coupled in any known fashion, e.g., welding, fasteners, etc.

As shown in the plan views of FIGS. 6 and 8, tubes 146 are arranged in any number of rows of tubes 180. FIG. 6 is taken along view line A-A in FIG. 5, and FIG. 8 is taken along view line B-B in FIG. 7. View lines A-A or B-B may be at one or more locations along a length of tubes 146 and at a distance sufficiently away from fixed ends 162, 164 of the tubes that the tubes may move despite their fixed ends. For purposes of description, three rows of tubes 180A, 180B, 180C are illustrated; however, as observed in FIGS. 2-3, any number of rows may be employed. As will be described, one or more rows of tubes 180B are movable.

Heat exchanger 108 may include a fixed mount 182 fixedly positioning row(s) of tubes 180A, 180C, e.g., relative to casing 140. (Hereafter, tubes are collectively referred to with reference 146, tubes that can move are referenced as 146M, and tubes that are fixed are referenced as 146F). Fixed mount 182 may include any structure capable of fixing a position of tubes 146F in fixed row(s) of tubes 180A, 180C. In the example shown, fixed mount 182 includes a mounting member 184 including a seat 186 for each heat exchange tube 146F of fixed row(s) of tubes 180A, 180C. Mounting member 184 is fixed to casing 140, e.g., by fasteners, welding, etc.

Heat exchanger 108 also includes a movable mount 190 operatively coupled to each movable row of tubes 180B. Movable mount 190 includes a second mounting member 192 including a seat 194 for each heat exchange tube 146M of movable row of tubes 180B. In contrast to fixed mount 182, movable mount 190 is movable between two or more positions. As shown in FIG. 6, a first, aligned position may cause heat exchange tubes 146M in row(s) of tubes 180B to be aligned with heat exchange tubes 146F in fixed row(s) of tubes 180A, 180C. As illustrated in FIG. 6, the aligned position creates a linear flow path 196 for fluid 142 through plurality of heat exchange tubes 146.

As shown in FIG. 8, a second, non-aligned position may cause heat exchange tubes 146M in movable row(s) of tubes 180B to not be aligned with heat exchange tubes 146F in row(s) of tubes 180A, 180C. As shown in FIG. 8, the non-aligned or staggered position creates a curvilinear flow path 198 for fluid 142 through heat exchange tubes 146.

As observed by comparing FIGS. 6 and 8, mounting member 192 of movable mount 190 is movable relative to casing 140 (FIGS. 2-3) to move row(s) of tubes 180B between the positions, i.e., movable mounting member 192 and row of tubes 180B are movable together. In FIG. 8, mounting member 192 is in a position, e.g., offset to the right, and in FIG. 6, mounting member 192 is slid to one side, e.g., to the left as shown by arrow C. Movable mount 190 (mounting member 192) and/or casing 140 may include any form of bearings necessary to allow the movement.

While one movable mount 190 is shown, any number of movable mounts 190 may be employed between fixed opposing ends 162, 164 of tubes 146. That is, any number of movable mounts 190 may be employed to move row(s) of tubes 180B between the aligned position (FIGS. 5 and 6) and the non-aligned position (FIGS. 7 and 8) at one or more locations between the opposing ends 162, 164 of tubes 146M in row(s) of tubes 180B. Movable mount 190 may move row(s) of tubes 180B from the aligned position to any non-aligned position and from any non-aligned position to the aligned position. Tubes 146 provide sufficient flexibility to allow the movement along their lengths.

In one embodiment, movable mount 190 may be manually moved between the aligned and non-aligned positions. In another embodiment, heat exchanger 108 may also include an actuator 200 operatively coupled to movable mount 190 to move row(s) of tubes 180B between the aligned position (FIGS. 5 and 6) and the non-aligned position (FIGS. 7 and 8). Actuator 200 may include any now known or later developed controllable linear actuator, e.g., electric motor, hydraulic ram, pneumatic ram, etc. Any form of transmission may also be employed. Any number of actuators 200 may be employed with any respective number of movable rows of tubes 180B. Movable rows of tubes 180B may also share an actuator 200.

In some embodiments, a control system 138 may be provided to activate actuator 200. Control system 138 may be configured to activate actuator 200 to move row(s) of tubes 180B between the aligned position and the non-aligned position. In the CCPP 100 example, the control system 138 may move the row(s) of tubes 180B, via the actuator 200, based on at least one operating parameter of heat exchanger 108, GT system 102 (FIG. 1) and/or ST system 110 (FIG. 1), or any other machine to which the heat exchanger is operatively coupled. It is understood that in other applications of heat exchanger 108, the operating parameters may vary depending on the machine(s) to which the heat exchanger is operatively coupled.

In the CCPP 100 example, for GT system 102 (FIG. 1), the operating parameters may include but are not limited to: exhaust temperature, volume, enthalpy, pressure, flow rate, GT exhaust velocity and Strouhal number, GT system load, ambient temperature, GT system degradation, GT system modification/uprating, and deviations between expected and actual operation. For heat exchanger 108, the operating parameters may include but are not limited to: heat transfer amount, duct burner load, steam or water temperature, flow rate, and resonance frequency tuning. For ST system 110 (FIG. 1), the operating parameters may include but are not limited to: steam temperature, volume, enthalpy, pressure, and flow rate.

Referring again to FIG. 3, in another embodiment, tubes 146 are arranged in a horizontal arrangement, and fluid 142 passes generally vertically therethrough. That is, plurality of heat exchange tubes 146 are arranged to extend in a substantially horizontal arrangement within casing 140, and fluid 142, e.g., GT exhaust, flows in a generally vertical direction. Opposing ends 262, 264 (FIG. 3) of tubes 146 are arranged similarly to that shown in FIGS. 5 and 7, i.e., with headers 166 at horizontally distanced opposing ends 262, 264 of tubes 146.

Figure 9:
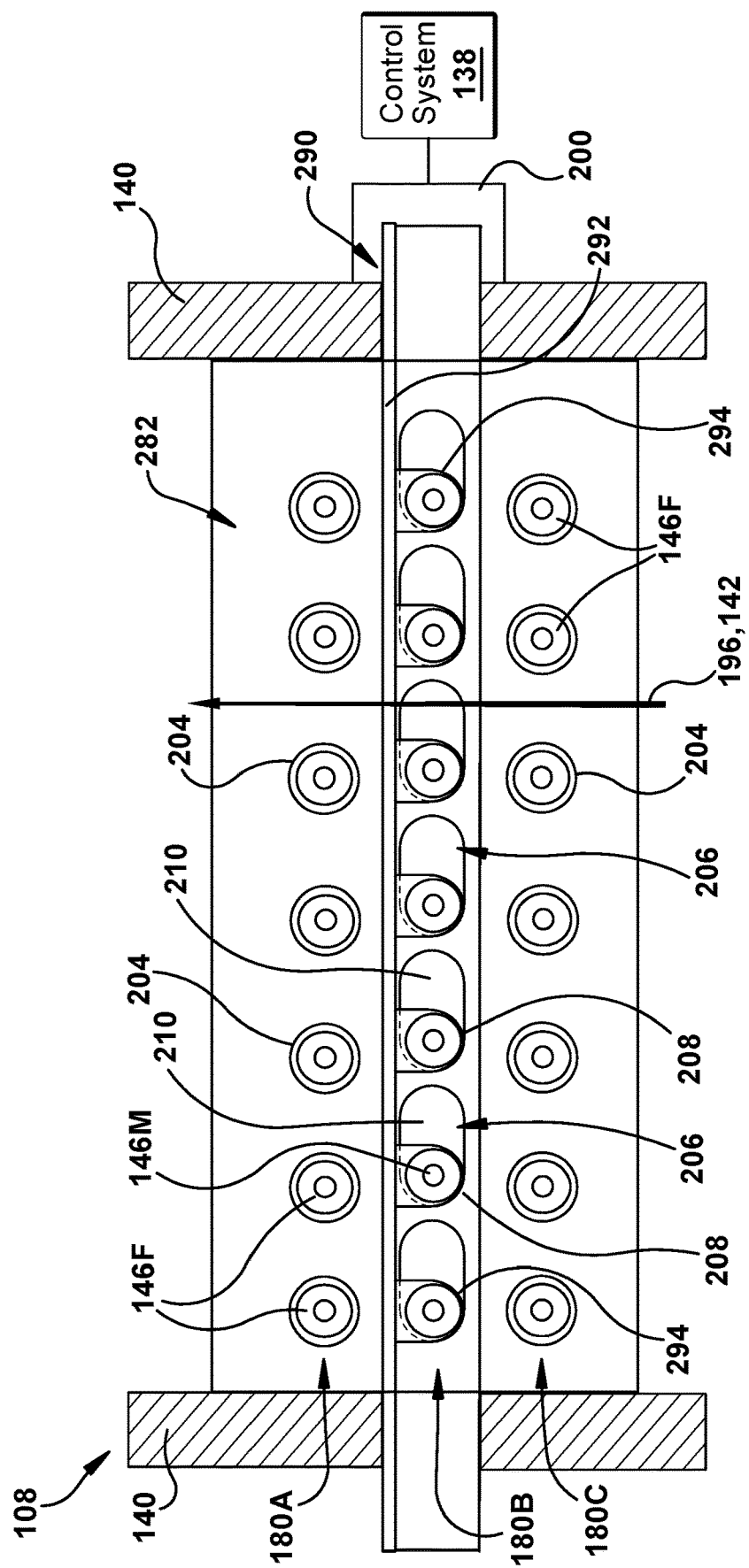
FIG. 9 shows a cross-sectional side view of a heat exchanger with horizontal heat exchange tubes in an aligned position, according to embodiments of the disclosure.
Figure 10:
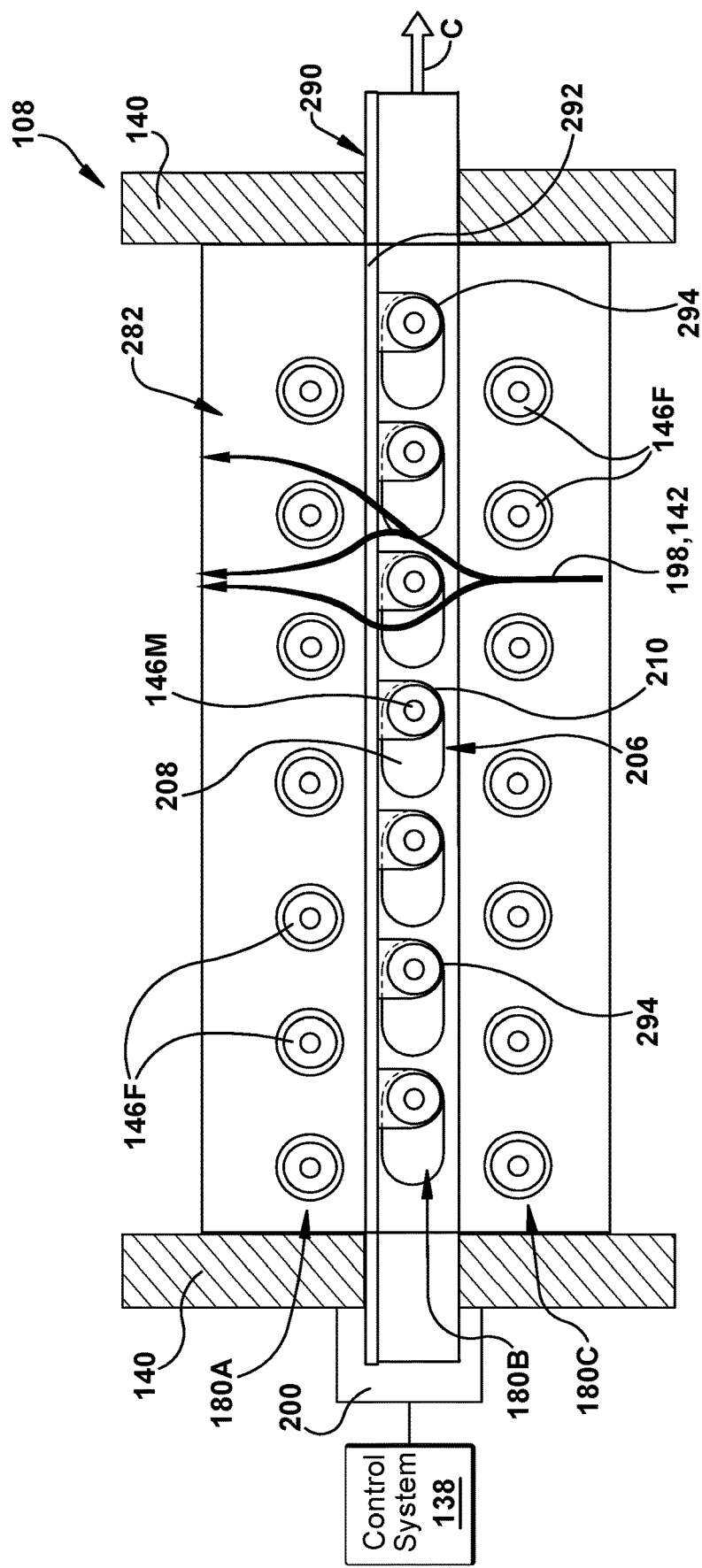
FIG. 10 shows a cross-sectional side view of the heat exchanger with horizontal heat exchange tubes in a non-aligned position, according to embodiments of the disclosure.

FIGS. 9 and 10 show cross-sectional side views of heat exchange tubes 146 and fixed and movable mounts, according to embodiments of the disclosure applicable to the FIG. 3 arrangement. Here, heat exchanger 108 includes a fixed mount 282. Fixed mount 282 is fixedly coupled to support 172, e.g., by fasteners and/or welds, and supports the weight of tubes 146. Fixed mount 282 includes a first opening 204 for each respective heat exchange tube 146F in fixed row of tubes 180A, 180C. Each first opening 204 is configured to position a respective tube 146F in a fixed position. For example, each first opening 204 has an inner diameter sized to allow thermal expansion but no other movement of a tube 146F therein.

Fixed mount 282 also includes a second opening 206 for each respective tube 146M in movable row(s) of tubes 180B. A line of second openings 206 may be provided for tubes 146M in movable row(s) of tube 180B. Each second opening 206 is configured to allow movement of a respective heat exchange tube 146M between the aligned position, as shown in FIG. 9, and the non-aligned position, as shown in FIG. 10. For example, as shown best in FIG. 9, second openings 206 have a first extent 208 configured to position a respective heat exchange tube 146M of movable row of tubes 180B in the aligned position and, as shown best in FIG. 10, a second contiguous extent 210 configured to position the respective heat exchange tube 146M in the non-aligned position. Each second opening 206 has vertical dimension sized to allow thermal expansion but no other vertical movement of a tube 146M therein. Contiguous extents 208, 210 allow lateral, horizontal movement of movable tubes 146M.

Heat exchanger 108 also includes movable mount 290 operatively coupled to each heat exchange tube 146M of movable row(s) of tubes 180B to move the row of tubes within second openings 206 between the aligned position and the non-aligned position. Movable mount 290 is separated from fixed mount 282 and can move independently thereof. A distance between movable mount 290 and a respective fixed mount 282 and the number of movable mounts 290 suitable to attain the desired movement may vary depending on, for example, the number of tubes, tube size and/or length, and other heat exchanger specific dimensions.

Movable mount 290 includes a mounting member 292 including a seat 294 for each heat exchange tube 146M of second row(s) of tubes 180B. In contrast to fixed mount 282, movable mount 290 is movable between, as shown in FIG. 9, an aligned position in which heat exchange tubes 146M in movable row(s) of tubes 180B are aligned with heat exchange tubes 146F in fixed row(s) of tubes 180A, 180C, and, as shown in FIG. 10, a non-aligned position in which heat exchange tubes 146M in movable row(s) of tubes 180B are not aligned (staggered) with heat exchange tubes 146F in fixed row(s) of tubes 180A, 180C.

As illustrated in FIG. 9, the first, aligned position creates linear flow path 196 for fluid 142 through plurality of heat exchange tubes 146. In contrast, as shown in FIG. 10, the second, non-aligned or staggered position creates a curvilinear flow path 198 for fluid 142 through heat exchange tubes 146. As observed by comparing FIGS. 9 and 10, mounting member 292 of movable mount 290 is movable relative to casing 140 (FIGS. 2-3) to move row(s) of tubes 180B between the aligned and non-aligned positions. In FIG. 9, mounting member 292 is in a position, e.g., offset to the left, in which tubes 146M are in extent 208 of second openings 206 in fixed mount 282. And, in FIG. 10, mounting member 292 is slid to one side, e.g., to the left as shown by arrow C and is in a position in which tubes 146M are in contiguous extent 210 of second openings 206 of fixed mount 282. Movable mount 290 (mounting member 292)

and support 172 may include any form of bearings appropriate to allow the desired movement.

While one movable mount 290 is shown, any number of movable mounts 290 may be employed between fixed opposing ends 162, 164 (FIG. 3) of tubes 146. That is, any number of movable mounts 290 may be employed to move row(s) of tubes 180B between the first, aligned position (FIG. 9) and the second, non-aligned position (FIG. 10) at one or more locations between the opposing ends of tubes 146M in row(s) of tubes 180B. Movable mount 290 may move row(s) of tubes 180B from the aligned position to the non-aligned position, from the non-aligned position to the aligned position, and to any location in between the two positions.

In one embodiment, movable mount 290 may be manually moved between the positions. In another embodiment, heat exchanger 108 may also include actuator 200 operatively coupled to movable mount 290 to move row(s) of tubes 180B between the aligned position (FIG. 9) and the non-aligned position (FIG. 10). Actuator 200 may include any now known or later developed controllable linear actuator, e.g., electric motor, hydraulic ram, pneumatic ram, etc. Any form of transmission may also be employed. Any number of actuators 200 may be employed with any respective number of movable rows of tubes 180B. In some embodiments, control system 138 may be provided to activate actuator 200. As previously described herein, control system 138 may be configured to activate actuator 200 to move row(s) of tubes 180B between positions based on at least one operating parameter of heat exchanger 108, GT system 102 (FIG. 1) and/or ST system 110 (FIG. 1), and/or any other machine to which the heat exchanger is operatively coupled.

It should be noted that, although FIGS. 6, 8, 9, and 10 illustrate an alternating arrangement of fixed tubes 146F and movable tubes 146M in which a row of movable tubes 180B follows a row of fixed tubes 180A, such a pattern is not required. Rather, different numbers of fixed rows 180A, 180C and different numbers of movable rows 180B may be employed in various combinations to achieve the desired flow paths 196, 198.

Embodiments of the disclosure may also include a method for operating an HRSG of CCPP 100 (FIG. 1). It will be understood that the method may be carried out by CCPP control system 138 (FIG. 1). The HRSG may include heat exchanger 108 including a plurality of heat exchange tubes 146 arranged in rows of tubes 180A, 180B, 180C, as described herein. In operation, at least one operating parameter of the HRSG, GT system 102 (FIG. 1) of CCPP 100 (FIG. 1) and/or ST system 110 (FIG. 1) of CCPP 100 (FIG. 1) is measured. The operating parameters of each can be any of the afore-mentioned parameters and can be measured in any appropriate manner, e.g., sensors, gauges, etc., and digitally communicated to control system 138 (FIG. 1).

Control system 138 can determine whether at least one operating parameter is not meeting a threshold, e.g., by comparison of measured value(s) to a threshold(s). In response to at least one operating parameter not meeting a threshold, control system 138 (FIG. 1) may move row(s) of tubes 180B relative to row(s) of tubes 180A, 180C. In one example, control system 138 may activate actuator 200 to move the row(s) of tubes 180B between the aligned position and the non-aligned position based on the at least one operating parameter not meeting the threshold, as described herein. The process can repeat to determine whether/how the tube position change has impacted the operating parameter(s).

The adjustable heat exchange tube positioning according to embodiments of the disclosure provides a number of advantages. The adjustment allows for the heat exchanger to adjust to heat input variations, e.g., of exhaust from a GT system, to an HRSG. The heat exchanger allows control of steam temperatures to facilitate better control for ST system start-up in a CCPP arrangement, i.e., compared to complex GT system output controls. For example, during the ST system start-up, placing the HRSG superheater and reheater tubes in the aligned position results in the generation of lower temperature steam, and gradual movement to the non-aligned position gradually increases steam temperature. The CCPP efficiency can also be increased when reduced heat transfer is required (aligned arrangement) due to reduction in desuperheater spray water and lower HRSG draft loss. A staggered arrangement can be used to provide, for example, increased heat transfer, increased draft loss, higher steam temperature for superheaters and reheaters, increased steam generation for evaporators and higher water temperatures for economizers.

The tubes 146M within the heat exchanger 108 can be adjusted to allow for better access for a cleaning tool (e.g., brush, power washer, etc.) by opening a linear path through the rows of tubes in the aligned position or another path, e.g., diagonal, through the row of tubes in the non-aligned position. Different positions allow access deeper into different rows of tubes.

Further, heat exchange tube positioning can be adjusted to address unexpected noise due to vortex shedding frequency resonance, during operation of the heat exchanger 108. For example, for a given heat input to an HRSG, GT exhaust velocity and Strouhal number (i.e., dimensionless number describing oscillating flow mechanisms) can be varied by adjusting the tube arrangement, eliminating vortex shedding frequency resonance, and eliminating the need for baffles to otherwise address the issue.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A heat exchanger, comprising:
   a casing configured to direct a first fluid therethrough;
   a plurality of heat exchange tubes fluidly coupled to a header and positioned within the casing, the plurality of heat exchange tubes arranged into a first row of tubes and a second row of tubes;
   a fixed mount fixedly positioning the first row of tubes relative to the casing; and
   a movable mount operatively coupled to the second row of tubes, the movable mount movable between an aligned position in which heat exchange tubes in the second row of tubes are aligned with heat exchange tubes in the first row of tubes, creating a linear flow path for the first fluid through the plurality of heat exchange tubes, and a non-aligned position in which heat exchange tubes in the second row of tubes are not aligned with heat exchange tubes in the first row of tubes, creating a curvilinear flow path for the first fluid through the plurality of heat exchange tubes,
   wherein heat is exchanged between the first fluid and a second fluid passing through the plurality of heat exchange tubes.

2. The heat exchanger of claim 1, wherein each of the plurality of heat exchange tubes includes a center tube and a plurality of disks extending outwardly therefrom.

3. The heat exchanger of claim 1, wherein the fixed mount includes:
   a first opening for each respective heat exchange tube in the first row of tubes, each first opening configured to position a respective first heat exchange tube in a fixed position; and
   a second opening for each respective heat exchange tube in the second row of tubes, each second opening configured to allow movement of a respective heat exchange tube between the aligned position and the non-aligned position, and
   wherein the movable mount is operatively coupled to each heat exchange tube of the second row of tubes to move the second row of tubes within the second openings between the aligned position and the non-aligned position.

4. The heat exchanger of claim 3, wherein each second opening has a first extent configured to position a respective heat exchange tube of the second row of tubes in the aligned position and a contiguous second extent configured to position the respective heat exchange tube of the second row of tubes in the non-aligned position.

5. The heat exchanger of claim 3, wherein the plurality of heat exchange tubes is arranged to extend in a substantially horizontal arrangement within the casing, and the first fluid flows in a generally vertical direction.

6. The heat exchanger of claim 1, wherein the fixed mount includes a first mounting member including a seat for each heat exchange tube of the first row of tubes, the first mounting member fixed to the casing; and
   wherein the movable mount includes a second mounting member including a seat for each heat exchange tube of the second row of tubes, the second mounting member movable relative to the casing to move the second row of tubes between the aligned and non-aligned positions.

7. The heat exchanger of claim 6, wherein the plurality of heat exchange tubes is arranged to extend in a substantially vertical arrangement within the casing, and the first fluid flows in a generally horizontal direction.

8. The heat exchanger of claim 1, wherein each of the plurality of heat exchange tubes is fixed at opposing ends thereof, and wherein the movable mount moves the second row of tubes between the aligned position and the non-aligned position at a location between the opposing ends of the heat exchange tubes in the second row of tubes.

9. The heat exchanger of claim 1, further comprising an actuator operatively coupled to the movable mount to move the second row of tubes between the aligned position and the non-aligned position.

10. The heat exchanger of claim 9, further comprising a control system configured to activate the actuator to move the second row of tubes between the aligned position and the non-aligned position based on at least one operating parameter of at least one of the heat exchanger and a machine to which the heat exchanger is operatively coupled.

11. The heat exchanger of claim 10, wherein the machine includes at least one of a gas turbine system and a steam turbine system.

12. The heat exchanger of claim 1, further comprising a plurality of the first row of tubes and a plurality of the second row of tubes.

13. A combined cycle power plant (CCPP), comprising:
    a gas turbine system;
    a steam turbine system; and
    a heat recovery steam generator (HRSG) coupled to the gas turbine system to create steam for the steam turbine system using an exhaust of the gas turbine system, wherein the HRSG includes:
       a casing configured to direct the exhaust therethrough;
       a plurality of heat exchange tubes fluidly coupled to a water/steam header and positioned within the casing, the plurality of heat exchange tubes arranged into a first row of tubes and a second row of tubes;
       a fixed mount fixedly positioning the first row of tubes relative to the casing; and
       a movable mount operatively coupled to the second row of tubes, the movable mount movable between an aligned position in which heat exchange tubes in the second row of tubes are aligned with heat exchange tubes in the first row of tubes, creating a linear flow path for the exhaust through the plurality of heat exchange tubes, and a non-aligned position in which heat exchange tubes in the second row of tubes are not aligned with heat exchange tubes in the first row of tubes, creating a curvilinear flow path for the exhaust through the plurality of heat exchange tubes,
       wherein heat is exchanged between the exhaust and a water/steam flow passing through the plurality of heat exchange tubes.

14. The CCPP of claim 13, wherein the fixed mount includes:
    a first opening for each respective heat exchange tube in the first row of tubes, each first opening configured to position a respective first heat exchange tube in a fixed position; and
    a second opening for each respective heat exchange tube in the second row of tubes, each second opening configured to allow movement of a respective heat exchange tube between the aligned position and the non-aligned position, and
    wherein the movable mount is operatively coupled to each heat exchange tube of the second row of tubes to move the second row of tubes within the second openings between the aligned position and the non-aligned position, wherein each second opening has a first extent configured to position a respective heat exchange tube of the second row of tubes in the aligned position and a contiguous second extent configured to position the respective heat exchange tube of the second row of tubes in the non-aligned position, and wherein the plurality of heat exchange tubes is arranged to extend in a substantially horizontal arrangement within the casing, and the exhaust flows in a generally vertical direction.

15. The CCPP of claim 13, wherein the fixed mount includes a first mounting member including a seat for each heat exchange tube of the first row of tubes, the first mounting member fixed to the casing;

wherein the movable mount includes a second mounting member including a seat for each heat exchange tube of the second row of tubes, the second mounting member movable relative to the casing to move the second row of tubes between the aligned and non-aligned positions, and wherein the plurality of heat exchange tubes is arranged to extend in a substantially vertical arrangement within the casing, and the exhaust flows in a generally horizontal direction.

16. The CCPP of claim 13, wherein each of the plurality of heat exchange tubes is fixed at opposing ends thereof, and wherein the movable mount moves the second row of tubes between the aligned position and the non-aligned position at a location between the opposing ends of the heat exchange tubes in the second row of tubes.

17. The CCPP of claim 13, further comprising an actuator operatively coupled to the movable mount to move the second row of tubes between the aligned position and the non-aligned position, and a control system configured to activate the actuator to move the second row of tubes between the aligned position and the non-aligned position based on at least one operating parameter of at least one of the gas turbine system, the HRSG, and the steam turbine system.

18. A method for operating a heat recovery steam generator (HRSG) of a combined cycle power plant (CCPP), the HRSG including a plurality of heat exchange tubes arranged in rows, the HRSG being part of a system including a gas turbine (GT) system and a steam turbine (ST) system, the method comprising:

measuring at least one operating parameter of at least one of the HRSG, the gas turbine (GT) system of the CCPP, and the steam turbine (ST) system of the CCPP;

in response to at least one operating parameter not meeting a threshold, moving a first row of the plurality of heat exchange tubes relative to a second, fixed row of the plurality of heat exchange tubes between an aligned position in which heat exchange tubes in the second, fixed row of the plurality of heat exchange tubes are aligned with heat exchange tubes in the first row of the plurality of heat exchange tubes, creating a linear flow path for a first fluid through the plurality of heat exchange tubes, and a non-aligned position in which heat exchange tubes in the second, fixed row of the plurality of heat exchange tubes are not aligned with heat exchange tubes in the first row of the plurality of heat exchange tubes, creating a curvilinear flow path for the first fluid through the plurality of heat exchange tubes, wherein heat is exchanged between the first fluid and a second fluid passing through the plurality of heat exchange tubes.

19. The method of claim 18, wherein each of the plurality of heat exchange tubes is fixed at opposing ends thereof, and wherein the moving includes moving the first row of tubes between the aligned position and the non-aligned position at a location between the opposing ends of the heat exchange tubes in the first row of tubes.

20. The method of claim 18, further comprising activating an actuator, via a control system, to move the first row of tubes between the aligned position and the non-aligned position; wherein the control system is configured to activate the actuator to move the first row of tubes between the aligned position and the non-aligned position based on the at least one operating parameter not meeting the threshold.

* * * * *